Feb. 18, 1941. E. J. O'DOWD 2,231,942
HYDRAULIC BRAKE SYSTEM
Filed March 6, 1939 3 Sheets-Sheet 1

INVENTOR.
Edward J. O'Dowd
BY George H. Simmons
ATTORNEY.

Patented Feb. 18, 1941

2,231,942

UNITED STATES PATENT OFFICE 2,231,942

HYDRAULIC BRAKE SYSTEM

Edward J. O'Dowd, Winnipeg, Manitoba, Canada

Application March 6, 1939, Serial No. 260,100

16 Claims. (Cl. 303—84)

This invention relates to hydraulic brake systems, more particularly to safety devices for use in such systems to enable a part of the system to be operated in case of a fault in another part thereof.

It is a main object of the invention to provide a safety device adapted to be installed as a self-contained unit in an existing hydraulic brake system.

It is a further object of the invention to provide a safety device, including a selector, which normally isolates brake cylinders and lines from the master cylinder of the system and which applies an initial test pressure to the lines and then connects the master cylinder to the lines which are in condition to receive working pressure.

Still another object of the invention is to provide a safety selector which in case of trouble in the selector permits the brakes to be operated normally but not immediately released, thereby to call attention to the trouble.

Still another object of the invention is to provide a safety device wherein all mechanisms of the system return to a normal position after each operation and move therefrom through a fixed set of operations each time the brakes are applied regardless of whether or not there is fault in the braking system.

Still another object of the invention is to provide a visual signal adapted to be lighted in case of a fault to call attention thereto.

Further objects of the invention, not specifically mentioned here, will be apparent from the detailed description and claims which follow, reference being had to the accompanying drawings in which a preferred embodiment of the invention is shown by way of example and in which:

In hydraulic brake systems, such as are commonly used on automotive vehicles, each wheel is provided with a wheel cylinder containing pistons which are moved to apply the brake through a suitable arrangement of levers and brake bands. The wheel cylinders are connected through suitable fluid columns to a single master cylinder which is actuated by the brake pedal of the vehicle to apply pressure to the system to apply the brakes. The master cylinder, fluid columns and wheel cylinders are all normally maintained full of gas free fluid which operates in a closed system so that pressure applied thereto by the master cylinder will be transmitted equally to all parts of the system.

The hydraulic brake of this type is advantageous in that, when the system is in proper operating condition the brakes are inherently equalized to give uniform braking resistance on all four wheels. A system of this kind is possessed of the disadvantage of being completely disabled should a fault develop in any part of it. Thus, for example, if one of the flexible tubings leading from the frame of the vehicle to the wheel cylinder should be ruptured, no pressure can be built up in the braking system and consequently the car is without brakes.

In the prior art of which I am aware, numerous attempts have been made to overcome this condition by providing for the isolation of a faulty part of the system from the remainder thereof so that the system may be operated in part under trouble conditions. In certain of these prior art devices, the braking arrangement for each wheel has been maintained entirely independent of the braking arrangement for every other wheel, the master cylinder being provided with a separate cylinder for each wheel, each cylinder having a piston and the pistons being moved simultaneously by the brake pedal of the vehicle. An arrangement of this kind has been found to destroy the inherent equalization of the brakes in the system and to overcome this fault, complicated arrangements of bi-passes have been provided in an effort to restore the inherent qualities of the hydraulic system. Such an arrangement is still subject to the criticism that unless installed in a vehicle initially the cost of converting an existing system to include these features is prohibitive.

In other prior art devices of which I am aware, the hydraulic braking system has been divided into two parts, the one extending to the front wheels of the vehicle and the other to the rear wheels thereof, the safety device being arranged to block off a faulty one of the two parts of the system so as to permit the other to function in a normal manner. These prior art devices have been subject to the criticism of complication and to the further criticism that in case the safety device itself becomes faulty, there is no way of knowing that it is faulty and consequently the initial fault in the braking system may go unnoticed for a considerable period of time. Certain ones of these devices are subject to the further criticism that once operated they remain in operated position and must be opened by a mechanic before they can be restored to normal.

Further, in certain of these prior art arrangements should the safety device become faulty, it prevents the brakes from being operated even though the brake system is in fully operative condition.

In accordance with the teachings of the present invention, the safety device is constructed as a unit complete in itself and adapted to be attached to or included in the braking system of an existing car with a minimum of labor. The safety device is arranged to divide the system into a front wheel part and a rear wheel part and to test each of these parts individually at the beginning of each operation of the brake pedal to determine whether or not the particular part is in condition to receive brake operating pressure. Under normal conditions, the fluid in the master cylinder is isolated from the fluid in the other two parts of the system, this isolation continuing through the testing stage of operation, and at the end of this testing stage, the fluid in the master cylinder part of the system is permitted to pass only into that part of the braking system which is in condition to receive operating pressure. As soon as the brake pedal is restored to normal, all parts of the system including the safety device return to a normal position regardless of whether or not a part of the brake system is faulty. A signal may be provided to indicate each time the safety device operates under trouble conditions thereby to immediately call attention to the fault, however, this is not necessary as the fault will be noticed through differences in the feel of the brake pedal.

In the preferred embodiment of the invention, the safety device is arranged so that in case trouble develops in the device itself, the brakes may be operated in the normal manner but will not release immediately upon the restoration of the brake pedal but rather some appreciable time will be required for the pressure in the systems to equalize thereby to release the brake. Under such conditions, should trouble develop in the safety device itself, it will be immediately noticed.

Referring now to the drawings in more detail, particularly Figures 1 to 8 inclusive, wherein a preferred embodiment of the invention is illustrated, it will be seen that the braking system of the vehicle includes wheel brake arrangements 1, 2, 3 and 4, which may be any existing hydraulic brake. It is sufficient to note here that each of these wheel brakes includes a cylinder containing pistons by which the brake bands are moved into engagement with the drums and containing a spring 5 by which the brake bands and pistons are restored to normal upon the removal of pressure from the fluid columns. Each individual wheel braking arrangement is connected by a fluid column indicated at 6 for the left hand or front wheels of the vehicle and at 7 for the right hand or rear wheels of the vehicle. The master cylinder 8 diagrammatically shown in Figure 1 may be of any preferred type of master cylinder adapted to apply pressure to the fluid columns responsive to an operation of the foot brake pedal 9. The safety device of the present invention indicated generally at 10 in Figure 1 will be seen to be connected to the master cylinder and between it and the fluid column 6 leading to the front wheels of the vehicle and the fluid column 7 leading to the rear wheels.

Figure 1:
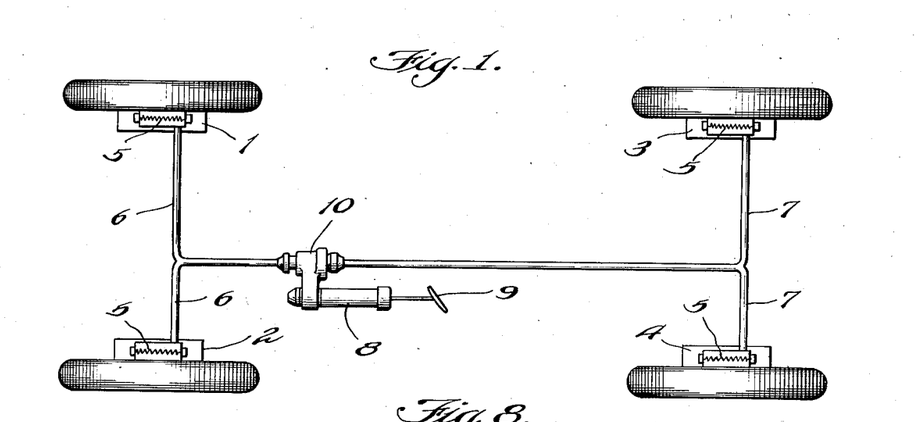
Figure 1 is a diagrammatic view of a hydraulic braking system of an automotive vehicle with the safety device of the present invention applied thereto.
Figure 2:
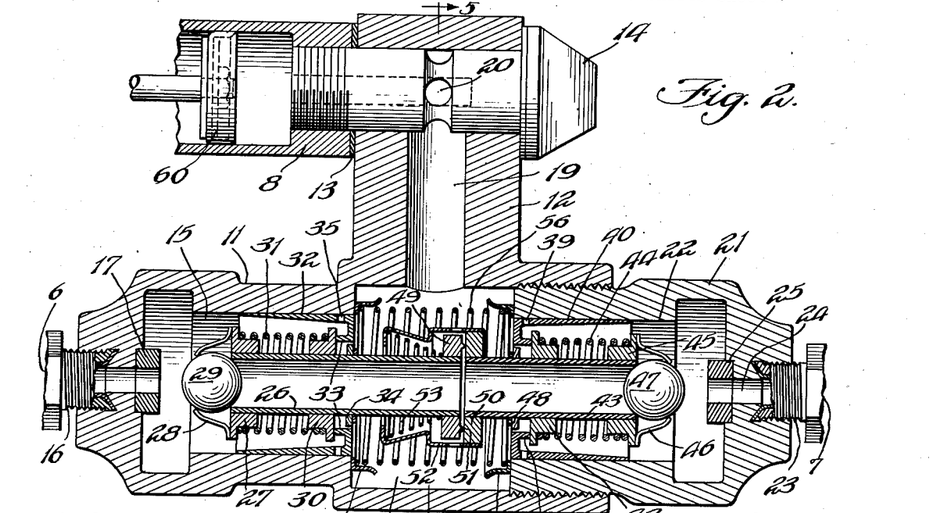
Figure 2 is a cross-sectional view through the safety selector in its normal position.

As will be seen in Figure 2, the device consists of a casing 11 having an extending portion 12 that may be seated against the end of the master cylinder 8 with suitable gaskets 13 interposed in the joint and held thereagainst by a hollow bolt 14 to mount the device upon the master cylinder. Preferably the bolt 14 is threaded with a standard thread which is the same as the thread used upon the fittings of a standard hydraulic brake system so that the safety device may be attached to existing master cylinders without necessitating any special drilling or tapping.

The main body portion 11 of the device contains a cylinder 15 which is closed at one end and threaded to receive a fitting 16 by which the line 6 is connected to the unit. The closed end of the cylinder contains a port through which the line 6 communicates with the interior, this port being surrounded by a suitable valve seat insert 17 for the purpose which will presently appear. Immediately adjacent to cylinder 15 is large diameter central cylinder portion 18 which communicates with the master cylinder through a duct 19 in the mounting portion 12 of the device and through the openings 20 in the mounting bolt 14.

The main body portion 11 is threaded at the open end to receive a cap portion 21 which contains a cylinder 22 of the same dimensions of and aligned with the cylinder 15 when the cap is threaded into the body portion. The cap is closed at its outer end and threaded to receive a fitting 23 by which the line 7 is connected thereto, the line communicating through a port 24 with the interior of the cap. A valve seat 25 surrounds the port 24 for a purpose which will presently appear.

When the cap is properly threaded into the main body portion of the device, cylinders 15 and 22 will be equidistant from the vertical centerline of chamber 18, Figure 2, and the valve seats 17 and 25 will also be equidistant from the centerline.

Located within the cylinder 15 is a hollow valve stem 26 which is disposed with its axis in alignment with the axis of the cylinder. A collar 27 is fixed upon one end of the stem to support a mounting 28 by which a suitable valve, such as the ball 29, is held fixed upon the stem.

The stem 26 also carries a slidable collar 30 which is connected to the collar 27 by a coil spring 31. A piston 32 is fitted in the cylinder 15 and around the stem 26, the piston including a lip 33 which abuts against the end of the collar 30 to form a pressure tight joint therebetween. Stem 26 also carries a fixed collar 34 for a purpose which will presently appear.

Fitted in the cylinder 22 is a piston 40 which is similar to the piston 32 and is provided with a lip 41 that abuts against and forms a pressure tight joint with a collar 42 that is slidably mounted upon a hollow valve stem 43 and connected by a spring 44 to a collar 45 that is fixed upon the outer end of the stem 43. The collar 45 also supports a mounting 46 by which a valve, such as the ball valve 47, is held upon the stem. Stem 43 also carries a fixed collar 48 which is similar to the collar 34 and employed for a purpose to be hereinafter explained. Although valves 29 and 47 are shown as ball valves, other suitable types of valves may be used within the teachings of the invention and the mountings therefor may be changed to suit the type of valve used.

Fixed upon the end of the valve stems 26 that is adjacent to the end of the valve stem 43 is a collar 49 that abuts against and forms a pressure tight joint with a collar 50 fixed upon the valve stem 43. A suitable seating member 51 is preferably formed on the collar 49 to insure that the joint will be pressure tight. Collar 50 also carries a mounting bracket 52 which extends around the collar 49 and therebeyond to form a footing for a coil spring 53 which surrounds the valve stem 26 and abuts against the collar 49 to maintain it against collar 50. By this arrangement, the two valve stems are maintained in axial alignment with each other under the tension fixed by tension of spring 53.

Figures 5, 6, 7, 8:
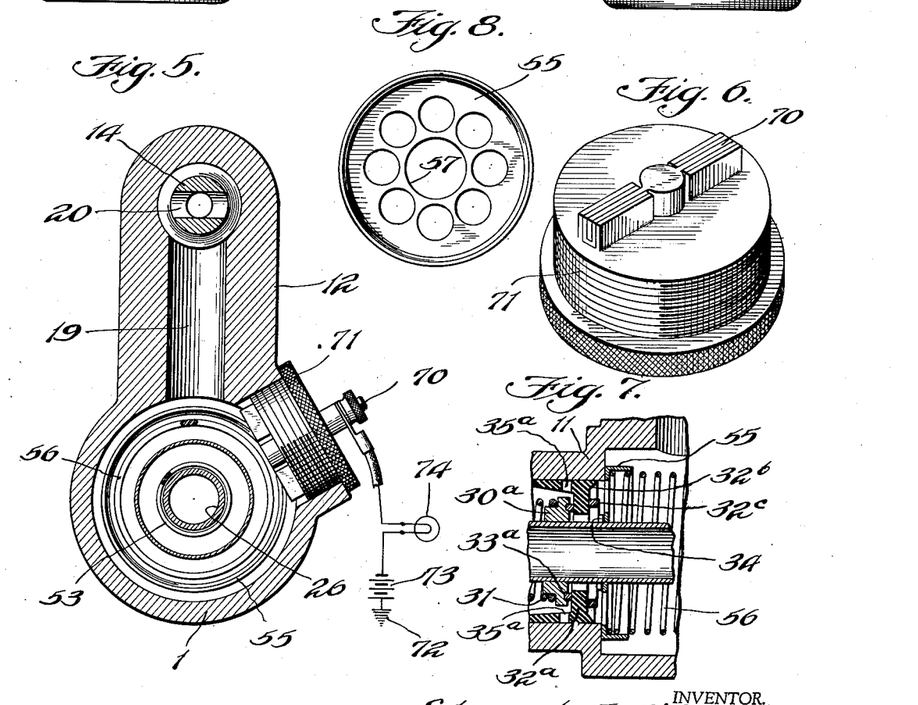
Figure 5 is a cross-sectional view taken substantially along the line 5—5 of Figure 2 looking in the direction of the arrows and showing particularly the signaling device.
Figure 6 is a perspective view of the bleeder control and signal device.
Figure 7 is a fragmentary cross-sectional view of the safety device showing a modified selector piston construction.
Figure 8 is a plan view of the spring retaining disc of the device.

In the central larger diameter portion 18 of the housing 11 are cupped perforated disks 55 which will be best seen in Figure 8. One of these disks 55 abuts against the shoulder between the central portion 18 and the cylinder 15 and the other abuts against the end of the cap 21. A coil spring 56 extends between cup members 55 and surrounds but does not engage the valve stems and bracket 52. Preferably this spring is tensioned to exert a pressure slightly above the normal pressure of the brake system, that is, a ten pound spring would be used in a system having a normal pressure of eight pounds.

The disks 55 extend inwardly and are provided with a central perforation 57 through which the valve stems 26 and 43 extend. Collar 34 on the valve stem 26 abuts against the left hand cupped disk 55, Figure 2, to limit the movement of the valve stem to the right as seen in this figure. Collar 48 on the valve stem 43 abuts against the right hand disk 55 thereby to limit the movement of the valve stem 43 to the left.

In the operation of the system under normal conditions, that is with the master cylinder 8 full of fluid and with lines 6 and 7 both intact and both filled with fluid, as the piston 60 in the master cylinder is moved to the right, Figure 2, pressure built up in the cylinder is communicated through the openings 20 and the bolt 14 and the duct 19 to the central chamber 18 of the safety device. The fluid in this chamber is forced outwardly through the perforations in the cupped disks 55 to bear against the inner ends of the piston 32 and collar 30 and the inner ends of the piston 40 and collar 42. These pistons and collars are moved to the left and right, respectively, against the tension of springs 31 and 44, respectively, until the collar 30 moves into engagement with the fixed collar 27 on the stem 26 and the collar 42 moves into engagement with the fixed collar 45 on the stem 43.

Figure 3:
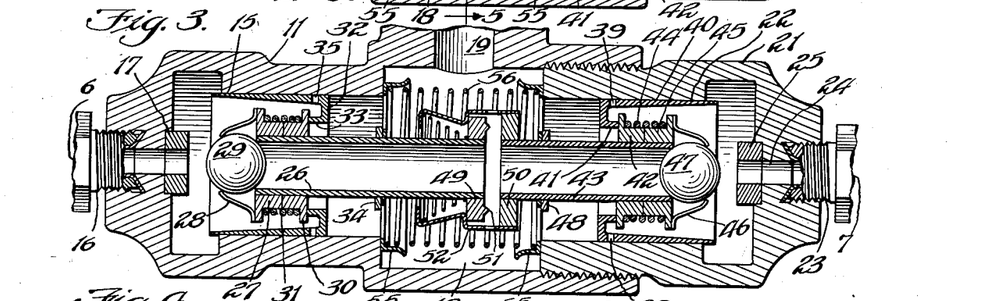
Figure 3 is a view similar to Figure 2 showing the parts in operated position under normal conditions.

Movement of the piston 32 to the left, Figure 2, applies pressure to the fluid confined in the cylinder 15, the line 6 and the brake cylinders 5 connected thereto. This pressure serving to test the lines to see whether or not they are in condition to receive working pressure. Similarly the movement of the piston 40 to the right, Figure 2, applies pressure to the fluid confined in the cylinder 22, the line 7 and the wheel cylinders connected thereto to test the same to see if they are in condition to receive pressure. If both lines are in proper working condition, the pressure opposing the outward movement of pistons 32 and 40 will be equal and the pistons will travel equal distances from the center line of the unit. Further pressure applied to the master cylinder piston 60 will move collar 30 into engagement with the collar 27 and collar 42 into engagement with collar 45, and will force the pistons in a continued movement outwardly to move the valve stems 26 and 42 outwardly to break the pressure tight joint between collars 49 and 50, this outward movement of the stems being against the tension of the spring 53. The parts will then assume the position in which they are shown in Figure 3. Further movement of the master cylinder piston will put pressure on the fluid in the central chamber causing that fluid to flow into the space between collars 49 and 50 to add pressure to the fluid normally contained in the hollow portions of the valve stems 26 and 43. This pressure will bear against the innermost faces of valves 29 and 47 to unseat them from the ends of valve stems so as to permit fluid in the valve stems to flow into the fluid columns 6 and 7 respectively. Thus it will be seen that the master cylinder is now directly connected to the fluid columns leading to the brake cylinder so as to operate those brakes in the usual manner. Operation of the brakes compresses the springs 5, Figure 1, to build up in them a restoring tension as will be well understood by those skilled in the art.

As soon as the lines 6 and 7 have received their fill of fluid, the pressures on the inner and outer faces of pistons 32 and 40 will be equalized even though the pressure put on the system by the master cylinder be maintained, and spring 53 will close collar 49 against collar 50 to reform the pressure tight joint therebetween. Ball valves 29 and 47 will be reseated upon stems 26 and 43 by the tension in their respective mountings so as to again isolate the fluid in the master cylinder and central chamber 18 from the fluid in lines 6 and 7, this re-isolation occurring while the master cylinder remains under pressure.

Often times the pressure put on the system during a service operation of the brakes will be high, perhaps as high as two hundred pounds, and a line that initially tests free of fault may be ruptured thereby. The rupture will cause a loss of fluid from the faulty line and a consequent reduction in the pressure therein, so as to unbalance the safety device and cause it to assume the position shown in Figure 4, in a manner that will presently appear.

As soon as pressure is removed from the system by releasing the foot brake pedal 19, the back pressure on the line exerted by springs 5 will force the fluids out of the lines 6 and 7 thereby to force pistons 32 and 40 from the position in which they are shown in Figure 3 back into the normal position in which they are shown in Figure 2, valve stems 26 and 43 simultaneously being carried back into engaging position of the collars 49 and 50 if the braking pressure has not been maintained long enough for these collars to have been reengaged by the operation of spring 53. When the pistons 32 and 40 have returned to their normal positions, the pressure in the lines 6 and 7 will still be above normal and piston 32 will move to the right, Figure 2, and will move the cupped disk 55 to the right against the tension of spring 56, this movement continuing sufficiently to bring the ports 35 in the piston past the shoulder against the disk 55 normally rests thereby to permit the excess fluid in the line 6 to flow through the piston into the central chamber 18. Similarly, piston 40 will move its disk 55 to the left, Figure 2, to move ports 39 past the end of the cap 21 so as to permit excess fluid in the lines 7 to return to the central chamber 18. As soon as pressures have equalized, tension in spring 56 restores disks 55 to the normal positions, in which they are shown in Figure 2, in readiness for the next brake operation.

Assume now that owing to trouble in the safety device pistons 32 and 40 are prohibited from returning to normal from the position in which they are shown in Figure 3. Such a condition would occur if the pistons 32 and 40 became wedged against sediment or rust accumulated on the walls of cylinders 15 and 22 respectively. As will be well understood by one skilled in the art, the fluid in a brake system becomes thick and gummy if used for a long time without being changed and it is possible that the safety device may become stuck. As soon as the brake pedal 10 is releasesd, pressure in the central chamber 18 will fall but since the pistons 32 and 40 are assumed to be stuck, they cannot move inwardly towards the center line of the unit and pressure in the line 6 and 7 will not be released.

Valves 29 and 47 having been forced into engagement with their respective seats in the ends of valve stems 26 and 43 to close off those ports, as explained above, the pressure in the lines 6 and 7 is maintained and the brakes consequently remain applied. While the joint between collar 30 and the lip portion 33 on the lip portion 32 is pressure tight, and the piston is in pressure tight engagement with the walls of cylinder 15, and the collar 30 fits snugly on valve stem 26, under conditions of continued pressure small leakage will occur and after a time the pressure in line 6 may fall sufficiently to permit the brake to release. Similarly, leakage past the piston 40 will in time permit the pressure in line 7 to fall sufficiently to release the brakes connected thereto.

Thus it will be seen that in case of a fault in the safety device itself, brakes may be applied in a normal manner but will not immediately release and the attention of the car owner will be called immediately to the fault.

If, as assumed above, the fluid in the brake system is allowed to remain unchanged long enough to accumulate sufficient sediment to block pistons 32 and 40, it is liable to block them against moving outwardly as well as inwardly. In this event, when pressure is applied to the fluid in the central chamber 18 will be transmitted past fixed collars 34 and 48 and against the adjacent faces of movable collars 30 and 42. This pressure will cause these collars to slide on valve stems 26 and 43 respectively away from pistons 33 and 40 to break the pressure tight seal therebetween, thereby permitting fluid to flow from the central chamber 18 directly into the lines 6 and 7. When pressure is removed by the master cylinder, the seats between collar 30 and piston 32 and collar 42 and piston 40 to hold the pressure on lines 6 and 7 and prevent immediate release of the brakes.

If collars 30 and 42 are struck so that they cannot slide along stems 26 and 43 respectively, pressure on the adjacent faces of these collars will move the stems apart thereby breaking the seal between collars 49 and 50 to permit fluid to flow into lines 6 and 7. Under these conditions, the brakes, when once applied, will be held in operated position as before, to call attention to the fault.

In all probability, a sediment condition in the brake system sufficient to block the selector as above will make the danger of brake failure imminent. The device of my invention in making possible the detection of incipient brake failure makes an additional distinct advance over the prior art.

Assume now that there is trouble in the line 7 leading to the rear brakes of the vehicle so that that line is not in condition to receive the normal working pressure of the system. As soon as the master cylinder is operated and the pressure in the central chamber 18 built up as before, the piston 40 will be moved to the right and since this movement will not be opposed by a counter pressure in the line 7, it will continue further than before, and valve 47 will be moved into engagement with valve seat 25 to close off the line 7. Line 6 being in normal operating position, the movement of piston 32 to the left, Figure 4, will be opposed by the normal operating pressure and also by the tension of spring 53. The movement of the stem 43 to the right moves the collar 52 to the right to increase the tension of spring 52 so as to cause collar 49 and the stem 26 that is fixed thereto to move to the right into the position shown in Figure 4. As a result of this, added spring tension, piston 32 will not be moved as far outwardly as is normal but it will be moved far enough to abut collar 30 against collar 27 so as to move valve stem 26 to the left to open the seat between collars 49 and 50. Pressures in the central chamber 18 are communicated through the valve stem 26 and valve stem 29 to the line 6 in the normal manner to permit normal operation of the brakes connected thereto. Spring 53 will function to close collar 49 against collar 50 to reform the pressure seal therebetween as soon as the pressure in the line 6 is equalized with the pressure in chamber 18, as before.

Figure 4:
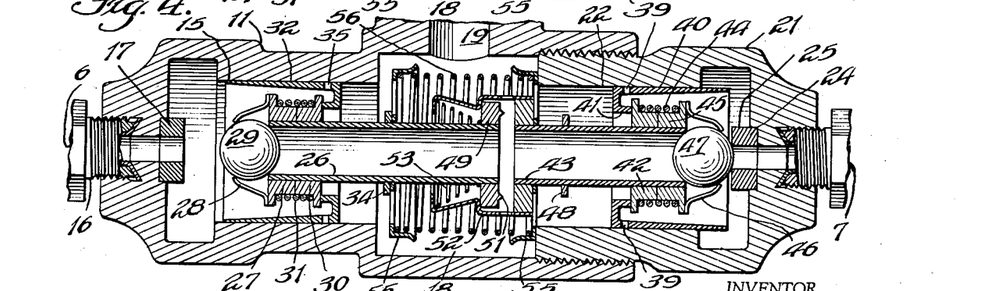
Figure 4 is a view similar to Figure 3 showing the parts in operated position under trouble conditions.

It will be noted in Figure 4 that movement of valve stems to the right of center causes collar 34 to move cupped disk 55 to the right against the tension of spring 56. As will be seen in Figures 5 and 6, a generally T-shaped member 70 is mounted in and insulated from a plug 71 screwed into the sidewalls 11 and extended into the central chamber 18. The free edge of the collared disk 55 is cupped outwardly so that when the disk is moved into the position in which it is shown in Figure 4, it will engage the insulated portion 70 and connect that portion through the frame of the vehicle through the brake system. As shown in Figure 5, an electrical circuit may be extended from the frame of the vehicle 72 through battery 73 and a suitable lamp 74 to the insulated member 70 so that when the disk 55 engages the same, the lamp 74 will be lighted to indicate that a fault exists.

When the foot pedal 9 is released under the conditions of operation illustrated in Figure 4, the tension of spring 56 bearing against the left hand disk 55 moves the valve stem assembly to the left to the normal non-operated position shown in Figure 2.

As is well understood by those skilled in the art in order to operate successfully a hydraulic system must be free of air or gas and it is necessary to frequently bleed the system to remove accumulations of air and gas therefrom. In a well equipped service station, there will be found bleeding mechanisms arranged to bleed the entire system as a unit, that is, connections are made simultaneously to the bleeding ports of each of the wheel cylinders and to the master cylinder and pressure is applied to the master cylinder to flush out the air and gas in the system. Under such conditions, both ends of the system are simultaneously reduced to the same pressure and the safety device assumes the position in which it is shown in Figure 2, and does not interfere with the bleeding operation. As soon as the operation is completed, the bleeding ports are again closed down and the safety device returns to normal with the rest of the system in readiness for operation. In a small garage or service station not equipped with such a machine, it may be necessary to bleed the wheel cylinders one at a time and if for example a cylinder on line 7 is open to atmosphere by opening the bleeder port, when pressure is applied to the master cylinder the parts would assume the position shown in Figure 4 and block off the line 7, thereby making bleeding impossible. The plug illustrated in Figures 5 and 6 is provided to permit bleeding the system under these conditions. By turning the plug through a quarter of a turn, insulated member 70 is moved from its normal position at right angles to the axis of the cylinders into a position parallel to the axes of cylinders in which latter position, it abuts against the flanged free edges of the perforated disks 55, thereby locking these disks against the shoulders against which they normally abut. This operation locks out the safety device by preventing valve 47 from coming into engagement with the seat 25 and bleeding of the line 7 may continue. As soon as the insulated member 70 is turned into engagement with the washers 55, signal lamp 74 will be lighted to remind the mechanic that the safety device is not in a normal position. The wheel cylinders may then be bled individually in the usual manner and when this operation is completed, the plug 71 is restored to its normal position to free members 55. Should the mechanic forget to restore the plug 71, the light will remain operated and the safety device will be disabled in part. However, under these conditions the brakes may be applied in a normal manner, but they cannot be released. As previously mentioned, upon release of braking pressure, disks 55 move inwardly toward each other to permit pistons 32 and 40 to move inwardly sufficiently to permit excess fluid in the lines 6 and 7 to return to the master cylinder through ports 35 and 39. Since the disks 55 are held by the bleeder plug excess pressure in lines 6 and 7 cannot be released and the brakes will remain applied until this pressure escapes through leakage. The mechanic will thus be reminded to restore the bleeder plug to normal.

If desired, the system can be bled without using plug 71 by bleeding one front and one back wheel. Under these conditions, the pressures in the safety device are equal and the device does not interfere with the bleeding operation.

As shown in Figures 2 to 4 inclusive, pistons 32 and 40 are metallic and are machined to a sliding fit in the cylinder 15 and 22 respectively. If desired, these pistons may be formed of rubber in the manner shown in Figure 7. Piston 32a formed of rubber differs from piston 32 in that it is provided with projecting lip 32b and with a boss 32c which extends beyond the lip to prevent the lip from being damaged by striking the perforated disk 55. Sliding collar 30a used in conjunction with the piston 32a is provided with a sealing gasket 33a against which the piston abuts to form a pressure tight joint. Piston 32a is provided with ports 35a through which excess fluid in the lines 6 and 7 escapes as the brakes are released. By the use of a piston of this type, a part of the accurate machining necessary to construct the device is eliminated.

In the embodiment of the invention shown in Figures 2 to 4 inclusive, the operating devices are formed in a self-contained unit. This unit consists of the stems 26 and 43 with the valves, collars and springs carried thereby, pistons 32 and 40, perforated disks 55 and the spring 56. This unit may be factory assembled and should the unit in a safety device require repairs the mechanic can remove the faulty unit by removing cap 21 and replace it with a new or a factory reconditioned unit, the units being interchangeable. The work of the mechanic is lessened and the chances of error made correspondingly less.

The casing 11 and cap 21 are formed so as to be free from pockets in which gas or air may collect, and in the operation of the safety device, fluid is circulated through the device into and out of the master cylinder and lines. As is well understood by those skilled in the art, modern master cylinders are arranged to clear small amounts of air or gas from the fluid, and by circulating the fluid through the safety device, I am able to keep it free from gas so as to maintain the system in proper operating condition.

Referring now to Figures 9 to 12 inclusive, wherein there is shown a modified form of the invention, it will be seen that the master cylinder is connected through a port 80 to the bottom of two parallel cylinders 81 and 82 and that these cylinders open into suitable ports into opposite ends of a transverse cylinder 83. A fluted piston 84 normally rests in the cylinder 81 at the bottom thereof against a spring 85. In addition to being fluted, the piston 84 is hollow and contains a valve 86 that is normally seated by the tension of spring 87 to close off the piston. A similar piston 88 is fitted in cylinder 82 and normally rests against a spring 89.

Figures 9, 10, 11, 12:
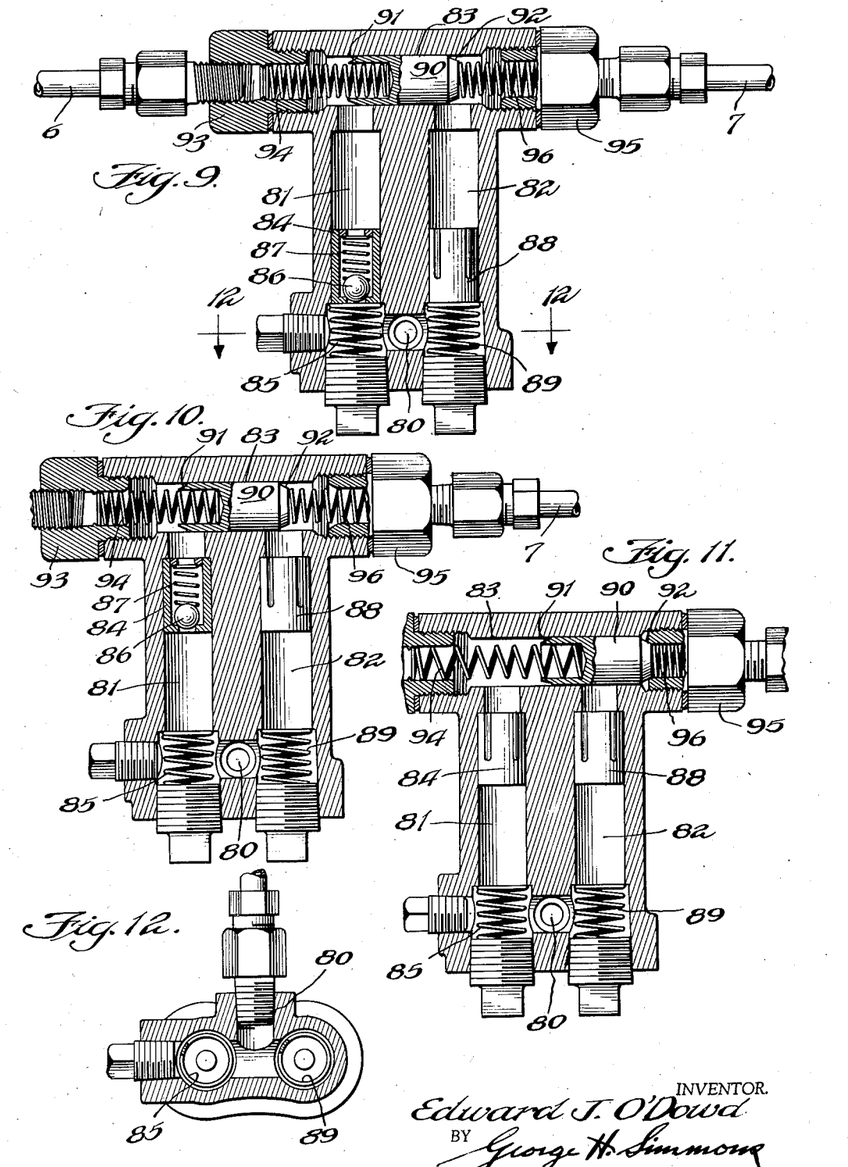
Figure 9 is a cross-sectional view of a modified form of safety device in normal position.
Figure 10 is a view similar to Figure 9 showing the device in operated position under normal conditions.
Figure 11 is a view similar to Figure 9 showing the device in operated position under trouble conditions.
Figure 12 is a cross-sectional view through the modified safety device taken substantially along the line 12—12 of Figure 9 looking in the direction of the arrows.

Fitted in the cylinder 83 is a piston 90 which is provided with a valve seat 91 located at one of its ends and a similar valve seat 92 at the opposite end. A plug 93 is threaded into the one end of cylinder 83, this plug containing a valve seat adapted to be engaged by seat 91 to close off that end of the cylinder. The plug 93 also serves as an abutment for a spring 94 that fits into a recess in the end of the piston 90. Line 6 leading to the front brakes of the vehicle is connected to the cylinder 83 through plug 93 by a suitable fitting.

A plug 95 similar to plug 93 is fitted into the other end of cylinder 83 and contains a seat that is engageable by seat 92 to close off the line 7 that is connected to the cylinder through plug 95. A spring 96 extends between plug 95 and the piston 90. Springs 94 and 96 are carefully calibrated to have the same tension so that piston 90 will be maintained centrally in the cylinder 83 in the position in which it is shown in Figure 9.

Fluid in the master cylinder extends through the port 80 and into the bottom of cylinders 81 and 82 and against the bottom face of pistons 84 and 88, being separated from the fluid in line 6 by the valve 86 and piston 84 and from the fluid in line 7 by the corresponding valve in piston 88. Lines 6 and 7 are separated from each other by the piston 90 in its central position.

When pressure is applied to the master cylinder by an operation of the foot pedal 9, pistons 84 and 88 are moved upwardly in their respective cylinders to apply pressure to lines 6 and 7 respectively, thereby to test them to see if they are in condition to receive working pressure. Pistons 84 and 88 move upwardly until they strike the upper ends of the cylinders 81 and 82 respectively at which time they are stopped. If both lines 6 and 7 are in proper order, the pressures on the two sides of piston 90 will be balanced and the piston will remain in the central part of cylinder 83 in the position in which it is shown in Figure 10. Further operation of the master cylinder will cause valve 86 and the corresponding valve in piston 88 to unseat so as to permit the brake fluid in the master cylinder to flow into line 6 and 7 to operate the brakes. As soon as the pressures above and below piston 84 equalizes, spring 87 reseats valve 86 to close off the master cylinder fluid from the fluid in line 6. The valve in piston 88 functions in a similar manner to close off the fluid in line 7.

When pressure is removed from the master cylinder back pressure and line 6 and 7 will operate on the upper sides of the valves and pistons 84 and 88 to move the pistons downwardly into their normal position against springs 85 and 89. If the pressure in line 6 and 7 is still above normal, when the pistons are in their normal positions, and it will be, the pistons will move through normal position and compress springs 85 and 89. It will be noted that the chambers in which these springs are located are of a diameter slightly larger than the diameter of cylinders 81 and 82 respectively so that as soon as the flutes or grooves in the pistons extend into the spring chambers fluid may flow past the pistons from the line 6 and 7 into the master cylinder line 80. As soon as the pressures have equalized, springs 85 and 89 return the pistons to the normal position in which they are shown in Figure 9.

Assume for the moment that line 7 is ruptured. As pressure is built up in the master cylinder piston 88 in moving upwardly will encounter little resistance since the line 7 is ruptured and cannot sustain a pressure. Piston 84 in building up the pressure on its side of the cylinder 83 will unbalance the piston 90 causing it to move to the right into the position in which it is shown in Figure 11, valve seat 92 closing off the line 7 to prevent flow of oil therein. Further pressure developed in the master cylinder will unseat the valve 86 to permit the fluid to flow through the piston 84 into the line 6 to operate the brakes connected thereto in the normal manner. As soon as the foot pedal is released and pressure in the master cylinder removed back, pressure in the line 6 will restore piston 84 to its normal position. However, since there will be no pressure on the top side of piston 88 and since there will be normal pressure on the bottom side thereof, piston 88 will remain in the position in which it is shown in Figure 11. Piston 84 may move through normal position against the tension of spring 85 to permit excess fluid in the line 6 to return to the master cylinder line 80.

Whether or not the piston 90 will be returned to its normal position at the end of the operation just described depends upon the tension of springs 94 and 96 with respect to the normal pressure in the system. If, for example, the system normally carries ten pounds of pressure and springs 94 and 96 are calibrated to a smaller tension, say five pounds, the combined action of spring 94 and the pressure on the left hand end of piston 90 will be too great to be overcome by the spring 96 and the valve will remain closed. If, however, the tension of springs 94 and 96 is greater than the normal pressure in the line, piston 90 will be moved back into the center of the cylinder 82 each time the system is returned to normal.

In order to bleed the lines of a system which includes the device shown in Figures 9 to 12 inclusive, it is necessary to bleed the wheel cylinders in pairs, one of the pair being connected to line 6 and the other one of the pair being connected to line 7, to maintain balance between the two ends of cylinder 83. Of course, all four wheel cylinders can be bled at once if desired.

From the foregoing it will be apparent that the device of my invention is possessed of many advantages. Either embodiment shown can be constructed as a self-contained unit that may be mounted either directly upon the master cylinder of an existing vehicle or upon the frame thereof adjacent to the master cylinder and hydraulically connected thereto. The safety device is inexpensive to construct and install. In normal operation, fluid in the brake lines is isolated from the fluid in the master cylinder so long as the master cylinder is in a neutral position, test pressure is applied during the initial operation of the master cylinder and during the main application of the brakes fluid in the master cylinder may flow freely into the lines leading to the brake cylinders as required. As soon as the lines have received their fill of liquid, the master cylinder is re-isolated from the lines even though brake pressure is maintained.

In case of fault preventing a line from taking pressure, the section of the system containing the fault is closed off so as to permit the remaining parts of the system to be operated in a normal manner. A signal may be provided to indicate each time a safety device has been operated, thereby to call attention to the fault. The device of my invention may also point out incipient faults, under certain conditions. The addition of the safety device to the system does not interfere with the operation of bleeding the lines nor is it necessary for mechanics to open up and enter into the safety device in order to bleed the lines.

In the foregoing description and in the drawings, I have shown and described a preferred embodiment of my invention by way of example, realizing that many modifications and changes in the specific structures shown may be made by one skilled in the art within the teachings of the invention. I am, therefore, not to be limited by the particular structures shown by way of example but rather only by the scope of the appending claims.

Having thus complied with the statutes and shown and described a preferred embodiment of my invention, what I consider new and desire to have protected by Letters Patent, is pointed out in the following claims.

What is claimed is:

1. In a hydraulic brake system, a master cylinder, a pair of brake cylinders, a fluid column leading from said master cylinder to said brake cylinders, a second pair of brake cylinders, a fluid column leading from said master cylinder to said second brake cylinders, means separating the master cylinder ends of said fluid columns from the brake cylinder ends thereof, means for operating said master cylinder to apply pressure to said fluid columns, said separating means being moved by said pressure to test the columns for receiving pressure, means for closing off a faulty column and valve means in said separating means operable by rising pressure in said master cylinder to momentarily connect together the two ends of said fluid columns and permit the flow of fluid from said master cylinder to said brake cylinders.

2. In a hydraulic brake system, a master cylinder, a pair of brake cylinders, a fluid column leading from said master cylinder to said brake cylinders, a second pair of brake cylinders, a fluid column leading from said master cylinder to said second brake cylinders, means separating the master cylinder ends of said fluid columns from the brake cylinder ends thereof, means for operating said master cylinder to build up pressure in said system, said separating means being moved by said pressure to test columns for receiving pressure, means for closing off a faulty column, valve means in said separating means operated by increasing pressure in the master cylinder to connect said columns thereto to build up pressure in the columns, means for closing said valve means during periods of sustained pressure in said master cylinder to separate said columns therefrom, and means for by-passing said separating means during periods of decreasing pressure in said master cylinder to equalize the pressure in said columns and master cylinder.

3. In a hydraulic brake system, a master cylinder, a fluid therein, a duct leading therefrom, two cylinders leading from said duct, a third cylinder with opposite ends of which said two cylinders communicate, fluid pressure lines leading out of said opposite ends of said third cylinder, brake means connected to each of said lines, valve means in said third cylinder, a piston in each of said two cylinders, said pistons moving simultaneously responsive to an application of pressure on said master cylinder fluid to apply pressure to said lines to test them, said valve means being operated in case of fault to close off the faulty line, stop means for limiting the movement of said pistons, and valves in said pistons opened after the pistons have engaged said stop means to permit fluid to pass from said master cylinder to said lines.

4. In a hydraulic brake system, a master cylinder, a fluid therein, a duct leading therefrom, two cylinders leading from said duct, a third cylinder with opposite ends of which said two cylinders communicate, fluid pressure lines leading out of said opposite ends of said third cylinder, brake means connected to each of said lines, valve means in said third cylinder, a piston in each of said two cylinders, said pistons moving simultaneously responsive to an application of pressure on said master cylinder fluid to apply pressure to said lines to test them, said valve means being operated in case of fault to close off the faulty line, stop means for limiting the movement of said pistons, valve means in said piston opened during periods of increasing pressure in the master cylinder after the pistons have engaged said stop means to permit fluid to enter said lines, said valve means being closed during periods of sustained pressure in the master cylinder to retain the fluid in said lines, and means for by-passing said valves upon removal of pressure from said master cylinder to permit fluid to flow from the lines into the master cylinder to equalize the pressures therein.

5. In a hydraulic brake system, a master cylinder containing a quantity of fluid and including means for developing fluid pressure, a selector unit hydraulically connected to said master cylinders, a pair of wheel brakes including cylinders, a fluid line connecting said cylinders to said selector unit, a second pair of wheel brakes including cylinders, a second fluid line connecting said second cylinders to said selector unit, said cylinders and fluid lines being filled with a quantity of fluid, means in said selector for isolating the fluid in said master cylinder from the fluid in said cylinders and lines, said means being operated by pressure in said master cylinder to transmit corresponding pressure through said lines to said wheel cylinders, valve means in said isolating means momentarily opened by an increasing pressure in said master cylinder to permit the fluid in said master cylinder to pass directly into said lines and wheel cylinders, and means for closing said valve means when the pressure in said lines equals the pressure in said master cylinder.

6. In a hydraulic brake system, a master cylinder, a fluid therein, a duct leading therefrom, two cylinders leading from said duct, a third cylinder with opposite ends of which said two cylinders communicate, fluid pressure lines leading out of said opposite ends of said third cylinder, brake means connected to each line, a valve in said third cylinder, valve seats in the ends of said third cylinder with which said valve may engage, spring means for maintaining said valve centered in said third cylinder, a piston in each of said two cylinders, said pistons being moved simultaneously responsive to an application of pressure on said master cylinder fluid to apply pressure to said lines to test them, said valve being operated into engagement with one of said seats in case of fault to close off the faulty line, stop means for limiting the movement of said pistons, calibrated spring pressed valves in said pistons operated by a predetermined pressure on said master cylinder fluid after the pistons have engaged said stop means to permit said master cylinder fluid to flow into said lines.

7. In a hydraulic brake system, a master cylinder, a fluid therein, a duct leading therefrom, two cylinders leading from said duct, a third cylinder with opposite ends of which said two cylinders communicate, fluid pressure lines leading out of opposite ends of said third cylinder, brake means connected to each of said lines, said brake means including means for applying back pressure to the line, valve means in said third cylinder, a fluted piston in each of said second cylinders, spring means for maintaining said pistons in normal positions in the cylinders, said pistons being moved simultaneously responsive to an application of pressure on said master cylinder fluid to apply pressure to said lines to test them, said valve means being operated in case of a fault to close off the faulty line, means for limiting the movement of said pistons, valves in said pistons opened after the pistons have engaged said limiting means to permit fluid to pass from said master cylinder to said lines to operate said brake means, said back pressure means applying back pressure to said lines when said master cylinder pressure is removed to move said pistons to and through said normal positions, there being ducts in said cylinders with which the flutes in said pistons are registered as the piston has moved through the normal position to permit said fluid to be returned to the master cylinder.

8. A safety device adapted to be connected in a hydraulic brake system between the master cylinder and wheel cylinders and adapted to enable one-half of the wheel cylinders to be operated normally under trouble conditions, comprising, a selector unit hydraulically connected to the master cylinder, means connecting one pair of wheel cylinders to one side of said selector, means connecting the other pair of wheel cylinders to the other side of said selector, pistons in said selector unit hydraulically isolating said pairs of wheel cylinders from said master cylinder, said pistons being moved by pressure built up in the master cylinder to apply test pressure to the wheel cylinders to test the same, valve means operated by said test pressure to close off a pair of wheel cylinders in case of a fault therein, and valve means in said selector pistons opened by pressure in the master cylinder to connect the master cylinder directly to the wheel cylinders.

9. In a brake system, a master cylinder containing fluid, means for exerting pressure on said fluid, a selector connected to said cylinder, a pair of axially aligned cylinders in said selector, a fluid filled conduit leading from each of said selector cylinders, brake means connected to said conduits, a piston in each one of said selector cylinders separating said master cylinder fluid from said conduit fluids, a hollow valve stem projecting through each one of said selector pistons, said stems being axially aligned and abutted together, means including a spring for holding said stems together to form a pressure tight joint therebetween, valve means on said valve stems, valve seats with which said valves co-operate to close off said conduits, said selector pistons being moved initially by pressure exerted on said master cylinder to apply test pressure to said conduit fluid and to engage the valve means and seat to close off a faulty conduit and moved finally to separate said stems to permit entrance of master cylinder fluid into the conduit to operate the brake means, and spring means for restoring said selector mechanism when pressure is removed by said master cylinder.

10. In a brake system, a fluid filled master cylinder, means for exerting pressure on said fluid, a selector connected to said cylinder, a pair of axially aligned cylinders in said selector, a fluid filled conduit leading from each of said selector cylinders, brake means connected to said conduit, a collared hollow valve stem in each selector cylinder, said valve stems being aligned axially with said cylinders and abutted together, means including a spring for holding said stems together to form a pressure tight joint therebetween, valve means carried on said stems, valve seats in said cylinders with which said valve means co-operate to close off said conduits, a piston slidably mounted upon each valve stem and engaging the associated selector cylinders to separate the master cylinder fluid from the conduit fluids, said pistons being moved initially by pressure exerted on said master cylinder fluid to slide along said valve stems and apply pressure to said conduit fluids to test the same and then moved against said stem collars to separate said stems and permit said master cylinder fluid to flow into said conduits to operate said brake means and means for restoring said selector mechanism to normal upon the removal of pressure from said master cylinder fluid.

11. In a brake system, a fluid filled master cylinder, means for exerting pressure on said fluid, a selector connected to said cylinder, a pair of axially aligned cylinders in said selector, a fluid filled conduit leading from each of said selector cylinders, brake means connected to said conduit, a collared hollow valve stem in each selector cylinder, said valve stems being aligned axially with said cylinders and abutted together, means including a spring for holding said stems together to form a pressure tight joint therebetween, valve means carried on said stems, valve seats in said cylinders with which said valve means co-operate to close off said conduits, a piston slidably mounted upon each valve stem and engaging the associated selector cylinders to separate the master cylinder fluid from the conduit fluids, said pistons being moved initially by pressure exerted on said master cylinder fluid to slide along said valve stems and apply pressure to said conduit fluids to test the same and then moved against said stem collars to separate said stems and permit said master cylinder fluid to flow into said conduits to operate said brake means, means for closing together said valves and stems to separate the conduit fluid from the master cylinder fluid during intervals of sustained pressure, and means for restoring said selector mechanism to normal upon the removal of pressure from said master cylinder fluid.

12. A safety device adapted to be connected to the master cylinder of the hydraulic brake system of an automotive vehicle, comprising, a cylindrical body containing axially aligned hollow cylinders jointed together by a central chamber, a mounting boss on said body, means for mounting said boss on the master cylinder, there being a duct in said boss hydraulically connecting said cylinders to said master cylinder, a self-contained operating unit in said body comprising a pair of hollow valve stems axially aligned together, means for forming a pressure tight joint between said stems, pistons on said stems engaging said cylinders, valve means on said stems, valve seats in said body with which said valves are seated by hydraulic pressure under trouble conditions, and means for connecting the brake lines to said body, said lines being closed off by said valves engaging said seats under trouble conditions.

13. A safety device adapted to be connected to the master cylinder of the hydraulic brake system of an automotive vehicle, comprising, a cylindrical body containing axially aligned hollow cylinders joined together by a central chamber, a mounting boss on said body, means for mounting said boss on the master cylinder, there being a duct in said boss hydraulically connecting said cylinders to said master cylinder, a self-contained operating unit in said body comprising a pair of hollow valve stems axially aligned together, means for forming a pressure tight joint between said stems, pistons on said stems engaging said cylinders, valve means on said stems, valve seats in said body with which said valves are seated by hydraulic pressure under trouble conditions and means including springs for restoring said operating unit to a normal position.

14. A safety device adapted to be connected to the master cylinder of the hydraulic brake system of an automotive vehicle, comprising, a cylindrical body containing axially aligned hollow cylinders joined together by a central chamber, a mounting boss on said body, means for mounting said boss on the master cylinder, there being a duct in said boss hydraulically connecting said cylinders to said master cylinder, a self-contained operating unit in said body comprising, a pair of hollow valve stems axially aligned, means for forming a pressure tight joint between said stems, pistons on said stems and slidable therealong and engaging said cylinders, valve means on said stems, valve seats on said body with which said valve means are seated by hydraulic pressure under trouble conditions, spring means on said unit for centering the same in said body, said unit being moved against said spring means to seat said valve, and means for locking said spring means to prevent said valve means from engaging said seats so as to permit bleeding said brake system.

15. A safety device adapted to be connected to the master cylinder of the hydraulic brake system of an automotive vehicle, comprising, a cylindrical body containing axially aligned hollow cylinders joined together by a central chamber, a mounting boss on said body, means for mounting said boss on the master cylinder, there being a duct in said boss hydraulically connecting said cylinders to said master cylinder, means connecting the fluid lines of the system to said body, fluid in said master cylinder, duct, chamber, cylinders and lines, means including pistons in said cylinders for isolating the fluid in the lines from the fluid in the chamber and master cylinder valve means by-passing said pistons to permit fluid to flow from said chamber to said lines, means for closing off a faulty line, and means for locking said closing off means to permit bleeding said lines.

16. In a safety device for hydraulic brake systems, a body containing a chamber, a pair of disks in said chamber, a spring extending between said disks, valve means extending through said disks, valve seats with which said valve means co-operate, means for operating said valve means into engagement with said seats, and means engaging said disks for locking said valve means out of engagement with said seats to permit bleeding the brake system.

EDWARD J. O'DOWD.